US012234427B2

(12) United States Patent
Tantawy et al.

(10) Patent No.: US 12,234,427 B2
(45) Date of Patent: Feb. 25, 2025

(54) PROCESS FOR MAKING A LAUNDRY DETERGENT COMPOSITION

(71) Applicant: The Procter & Gamble Company, Cincinnati, OH (US)

(72) Inventors: Hossam Hassan Tantawy, Northumberland (GB); Eric San Jose Robles, Newcastle upon Tyne (GB); Hossein Ahmadian, Newcastle upon Tyne (GB); Claire Louise Duckitt, Newcastle upon Tyne (GB); Paul Anthony Gould, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 500 days.

(21) Appl. No.: 17/513,983

(22) Filed: Oct. 29, 2021

(65) Prior Publication Data

US 2022/0049194 A1 Feb. 17, 2022

Related U.S. Application Data

(63) Continuation of application No. PCT/US2020/027568, filed on Apr. 10, 2020.

(30) Foreign Application Priority Data

Apr. 29, 2019 (EP) .................................... 19171583

(51) Int. Cl.

| | |
|---|---|
| ***C11D 10/00*** | (2006.01) |
| ***C11D 10/04*** | (2006.01) |
| ***C11D 11/02*** | (2006.01) |
| ***C11D 17/06*** | (2006.01) |
| *C11D 1/22* | (2006.01) |
| *C11D 9/02* | (2006.01) |

(52) U.S. Cl.

CPC .......... *C11D 10/045* (2013.01); *C11D 10/042* (2013.01); *C11D 11/02* (2013.01); *C11D 17/06* (2013.01); *C11D 1/22* (2013.01); *C11D 9/02* (2013.01); *C11D 2111/12* (2024.01)

(58) Field of Classification Search

CPC .................................................... C11D 10/045

See application file for complete search history.

(56) References Cited

U.S. PATENT DOCUMENTS

| | | | | |
|---|---|---|---|---|
| 4,876,023 | A * | 10/1989 | Dickenson ........... | C11D 17/046 510/296 |
| 5,723,428 | A | 3/1998 | Boskamp et al. | |
| 2003/0199414 | A1* | 10/2003 | Boutique ............. | C11D 3/2086 510/293 |

FOREIGN PATENT DOCUMENTS

| | | | |
|---|---|---|---|
| CN | 101503647 | A | 8/2009 |
| EP | 0360330 | A2 | 3/1990 |
| EP | 0328190 | B1 | 5/1994 |
| EP | 0985016 | B1 | 10/2001 |
| EP | 0942958 | B1 | 12/2001 |
| RU | 2288896 | C2 | 12/2006 |
| RU | 2305701 | C2 | 9/2007 |

OTHER PUBLICATIONS

Extended European Search Report and Search Opinion; Application No. 19171583.8; dated Sep. 25, 2019; 10 pages.

PCT Search Report and Written Opinion for PCT/US2020/027568 dated Jun. 30, 2020, 15 pages.

* cited by examiner

*Primary Examiner* — Necholus Ogden, Jr.

(74) *Attorney, Agent, or Firm* — Gary J. Foose

(57) ABSTRACT

The present invention relates to a process for preparing a solid free-flowing particulate laundry detergent composition, wherein the process includes the steps of: (a) forming a mixture by contacting: (i) molten fatty acid; (ii) liquid alkaline ingredient, and (iii) non-ionic surfactant, to obtain a mixture, wherein the mixture includes: (i) partially neutralized fatty acid component; (ii) non-ionic surfactant; and (iii) water, wherein the molar ratio of fatty acid to liquid alkaline ingredient contacted together in step (a) is above 1:1; (b) contacting the mixture obtained in step (a) to a detergent powder to form a solid free-flowing particulate laundry detergent composition, wherein in step (b) the mixture is contacted to the detergent powder by spraying the mixture at a temperature of greater than 50° C. onto the detergent powder, wherein the detergent powder includes a detergent ingredient.

11 Claims, No Drawings

PROCESS FOR MAKING A LAUNDRY DETERGENT COMPOSITION

FIELD OF THE INVENTION

The present invention relates to a process of making a solid free-flowing particulate laundry detergent composition. The process provides a solid free-flowing particulate laundry detergent composition comprising non-ionic surfactant. The solid free-flowing particulate laundry detergent compositions provided by the process of the present invention exhibit good flow characteristics, such as flow function.

BACKGROUND OF THE INVENTION

Detergent manufacturers incorporate non-ionic surfactant into their solid free-flowing particulate laundry detergent compositions to improve the cleaning performance of the composition. However, incorporation of non-ionic surfactant into the composition results in poor powder flow characteristics. The present invention overcomes this problem by providing a process for preparing a preparing a solid free-flowing particulate laundry detergent composition. The process involves the partial neutralization of a fatty acid that is mixed with the non-ionic surfactant prior to contacting the mixture to a detergent powder, e.g. by spraying. The process of the present invention provides a means of incorporating non-ionic surfactant into the composition in such a manner so that the resultant composition exhibits good powder flow characteristics such as flow function.

SUMMARY OF THE INVENTION

The present invention provides a process for preparing a solid free-flowing particulate laundry detergent composition, wherein the process comprises the steps of: (a) forming a mixture by contacting: (i) molten fatty acid; (ii) liquid alkaline ingredient, and (iii) non-ionic surfactant, to obtain a mixture, wherein the mixture comprises: (i) partially neutralized fatty acid component, wherein the partially neutralized fatty acid component comprises fatty acid and soap; (ii) non-ionic surfactant; and (iii) water, wherein the molar ratio of fatty acid to liquid alkaline ingredient contacted together in step (a) is above 1:1; (b) contacting the mixture obtained in step (a) to a detergent powder to form a solid free-flowing particulate laundry detergent composition, wherein the detergent powder comprises a detergent ingredient, wherein the solid free-flowing particulate laundry detergent composition comprises: (i) non-ionic surfactant; (ii) soap; (iii) fatty acid; (iv) water; and (v) detergent ingredient.

DETAILED DESCRIPTION OF THE INVENTION

The present invention relates to a process for preparing a solid free-flowing particulate laundry detergent composition, wherein the process comprises the steps of: (a) forming a mixture by contacting: (i) molten fatty acid; (ii) liquid alkaline ingredient, and (iii) non-ionic surfactant, to obtain a mixture, wherein the mixture comprises: (i) partially neutralized fatty acid component, wherein the partially neutralized fatty acid component comprises fatty acid and soap; (ii) non-ionic surfactant; and (iii) water, wherein the molar ratio of fatty acid to liquid alkaline ingredient contacted together in step (a) is above 1:1; (b) contacting the mixture obtained in step (a) to a detergent powder to form a solid free-flowing particulate laundry detergent composition, wherein in step (b) the mixture is contacted to the detergent powder by spraying the mixture at a temperature of greater than 50° C. onto the detergent powder, wherein the detergent powder comprises a detergent ingredient, wherein the solid free-flowing particulate laundry detergent composition comprises: (i) non-ionic surfactant; (ii) soap; (iii) fatty acid; (iv) water; and (v) detergent ingredient.

Process for Preparing a Solid Free-Flowing Particulate Laundry Detergent Composition:

The process comprises the steps of: (a) forming a mixture by contacting: (i) molten fatty acid; (ii) liquid alkaline ingredient, and (iii) non-ionic surfactant, to obtain a mixture, wherein the mixture comprises: (i) partially neutralized fatty acid component, wherein the partially neutralized fatty acid component comprises fatty acid and soap; (ii) non-ionic surfactant; and (iii) water, wherein the molar ratio of fatty acid to liquid alkaline ingredient contacted together in step (a) is above 1:1; (b) contacting the mixture obtained in step (a) to a detergent powder to form a solid free-flowing particulate laundry detergent composition, wherein in step (b) the mixture is contacted to the detergent powder by spraying the mixture at a temperature of greater than 50° C. onto the detergent powder, wherein the detergent powder comprises a detergent ingredient, wherein the solid free-flowing particulate laundry detergent composition comprises: (i) non-ionic surfactant; (ii) soap; (iii) fatty acid; (iv) water; and (v) detergent ingredient.

Step (a) Forming a Mixture:

Step (a) forms a mixture by contacting: (i) molten fatty acid; (ii) liquid alkaline ingredient, and (iii) non-ionic surfactant. The mixture comprises: (i) partially neutralized fatty acid component, wherein the partially neutralized fatty acid component comprises fatty acid and soap; (ii) non-ionic surfactant; and (iii) water, wherein the molar ratio of fatty acid to liquid alkaline ingredient contacted together in step (a) is above 1:1.

Preferably, step (a) is carried out in a mixer having a tip speed in the range of at least 10 $ms^{-1}$, and preferably from 10 $ms^{-1}$ to 30 $ms^{-1}$.

Step (b) Forming a Solid Free-Flowing Particulate Laundry Detergent Composition:

Step (b) contacts the mixture obtained in step (a) to a detergent powder to form a solid free-flowing particulate laundry detergent composition. The detergent powder comprises a detergent ingredient. The solid free-flowing particulate laundry detergent composition comprises: (i) non-ionic surfactant; (ii) soap; (iii) fatty acid; (iv) water; and (v) detergent ingredient.

Preferably, in step (b) the mixture is contacted to the detergent powder by spraying the mixture at a temperature of greater than 40° C., or greater than 50° C., or even greater than 55° C. onto the detergent powder.

Mixture:

The mixture comprises: (i) partially neutralized fatty acid component, wherein the partially neutralized fatty acid component comprises fatty acid and soap; (ii) non-ionic surfactant; and (iii) water.

Preferably, the weight ratio of partially neutralized fatty acid component to non-ionic surfactant in the mixture obtained in step (a) is in the range of from 1:0.05 to 1:0.30.

Preferably, the mixture obtained in step (a) comprises: (i) from 4.0 wt % to 24.0 wt % partially neutralized fatty acid component, wherein the partially neutralized fatty acid component comprises: (i)(i) from 38.0 wt % to 84.0 wt % fatty acid; and (i)(ii) from 16.0 wt % to 62.0 wt % soap; (ii) from 75 wt % to 95 wt % non-ionic surfactant; and (iii) from 0.15 wt % to 2.80 wt % water.

Fatty Acid:

The fatty acid is an alkyl carboxylic acid, typically having the structure R—COOH, wherein R is the alkyl chain. Typically, R is a $C_7$-$C_{23}$ alkyl chain. Preferably, the fatty acid is a $C_{16}$-$C_{18}$ fatty acid. The fatty acid can be saturated, unsaturated or a mixture of saturated and unsaturated.

The fatty acid is in molten form during step (a). Typically, during step (a), the fatty acid is at a temperature at least 5° C. or 10° C. greater than the melting range of the fatty acid. Typically, step (a) is carried out at a temperature above 50° C. or even 60° C.

Preferably, the solid free-flowing particulate laundry detergent composition comprises: (i) fatty acid in crystalline form; and (ii) soap in crystalline form. The skilled person can control the crystallinity of the fatty acid by ensuring the fatty acid is below its melting point. The melting point of the fatty acid can be controlled its degree of neutralization, increasing the degree of neutralization increases the melting point of the fatty acid.

Soap:

Soap is a salt of a fatty acid. Typically, soap has the structure $R—COO^-M^+$, wherein R is an alkyl chain, and $M^+$ is a cation. Typically, R is a $C_7$-$C_{23}$ alkyl chain. Typically, $M^+$ is any alkali metal cation, suitable cations include $Na^+$, $K^+$.

Partially Neutralized Fatty Acid Component:

Preferably, the molar ratio of fatty acid to soap in the partially neutralized fatty acid component is in the range of from 1:0.5 to 1:5.0.

Preferably, the degree of neutralization of the partially neutralized fatty acid is in the range of from 30% to 60%, more preferably from 40% to 50% (molar %).

Crystalline Form of Fatty Acid and Soap:

When present in the solid free-flowing particulate laundry detergent composition, typically the fatty acid is in crystalline form. At least part of the fatty acid can form fatty acid crystals, typically having the crystal structure R—COOH, wherein R is the alkyl chain of the molecule. This is typically known as the free fatty acid crystalline form.

When present in the solid free-flowing particulate laundry detergent composition, typically the soap is in crystalline form. At least part of the soap can form soap crystals, typically having the crystal structure $R—COO^-M^+$, wherein R is the alkyl chain of the molecule and $M^+$ is a cation. This is typically known as the free soap crystalline form.

At least part of the fatty acid and at least part of the soap can co-crystallize together to form co-crystals. These co-crystals may have different structures depending on how many molecules of fatty acid and soap co-crystalize together. Typical crystal structures include $NaH_2(R—COO)_3$, $NaH(R—COO)_2$, $Na_2H(R—COO)_3$, and wherein R is the alkyl chain of the molecules. Co-crystals can be formed by partially neutralizing the fatty acid to form a mixture of fatty acid and soap at elevated temperature and then allowing the mixture to cool to below the melting point of the co-crystal.

It may be preferred to minimize the amount of free fatty acid crystalline form and/or free soap crystalline form present in the solid free-flowing particulate laundry detergent composition. It may be preferred to maximize the amount of co-crystalline form of the fatty acid and soap. A low degree of neutralization will tend to result in high levels of free fatty acid crystals and co-crystals having the structure $NaH_2(R—COO)_3$. A high degree of neutralization will tend to result in high levels of free soap crystals and co-crystals having the structure $Na_2H(R—COO)_3$.

Liquid Alkaline Ingredient:

Any liquid alkaline ingredient can be used. A preferred liquid alkaline ingredient is a liquid alkali metal hydroxide. A highly preferred liquid alkaline ingredient is sodium hydroxide.

Non-Ionic Surfactant:

Suitable non-ionic surfactants include alkoxylated alcohols. A preferred non-ionic surfactant is an alkoxylated $C_8$-$C_{18}$ alkyl alcohol having an average degree of ethoxylation of from 3 to 10. A preferred non-ionic surfactant is an ethoxylated $C_8$-$C_{18}$ alkyl alcohol having an average degree of ethoxylation of from 3 to 10.

The non-ionic surfactant may be linear or branched. A suitable non-ionic surfactant is a linear $C_8$-$C_{18}$ alkyl alcohol having an average degree of ethoxylation of from 3 to 10. Another suitable non-ionic surfactant is a branched $C_8$-$C_{18}$ alkyl alcohol having an average degree of ethoxylation of from 3 to 10.

Detergent Powder:

Typically, the detergent powder comprises a detergent ingredient. Preferably, the detergent powder comprises an anionic detersive surfactant. Preferably, the detergent powder comprises an alkyl benzene sulphonate.

The detergent powder can be a detergent base powder, such as a spray-dried powder or an agglomerate. The detergent powder can be a mixture of different types of detergent particles. Suitable detergent particles are described in more detail below.

Detergent Ingredient:

Preferably, the detergent ingredient is an anionic detersive surfactant. A preferred anionic detersive surfactant is an alkyl benzene sulphonate. Other suitable detergent ingredients are described in more detail below.

Solid Free-Flowing Particulate Laundry Detergent Composition:

Preferably, the solid free-flowing particulate laundry detergent composition comprises less than 0.1 wt % fatty acid. Preferably, the solid free-flowing particulate laundry detergent composition comprises from above 0 wt % to 0.1 wt % fatty acid.

Preferably, the solid free-flowing particulate laundry detergent composition comprises: (i) fatty acid in crystalline form; and (ii) soap in crystalline form.

Preferably, the solid free-flowing particulate laundry detergent composition comprises: (i) from 0.2 wt % to 5.0 wt % non-ionic surfactant; (ii) from 0.0035 wt % to 0.2700 wt % fatty acid (iii) from 0.0015 wt % to 0.1800 wt % soap; (iv) from 0.0003 wt % to 0.0370 wt % water comprised by the mixture formed in step (a); (v) from 5.0 wt % to 25 wt % anionic detersive surfactant; and (vi) optionally, from 0.01 wt % to 15.00 wt % polymer.

Typically, the solid free-flowing particulate laundry detergent composition is a fully formulated laundry detergent composition, not a portion thereof such as a spray-dried, extruded or agglomerate particle that only forms part of the laundry detergent composition. Typically, the solid composition comprises a plurality of chemically different particles, such as spray-dried base detergent particles and/or agglomerated base detergent particles and/or extruded base detergent particles, in combination with one or more, typically two or more, or five or more, or even ten or more particles selected from: surfactant particles, including surfactant agglomerates, surfactant extrudates, surfactant needles, surfactant noodles, surfactant flakes; phosphate particles; zeolite particles; silicate salt particles, especially sodium silicate particles; carbonate salt particles, especially sodium carbonate particles; polymer particles such as carboxylate polymer particles, cellulosic polymer particles, starch particles, polyester particles, polyamine particles, terephthalate polymer particles, polyethylene glycol particles; aesthetic particles such as coloured noodles, needles, lamellae particles and ring particles; enzyme particles such as protease granulates, amylase granulates, lipase granulates, cellulase granulates, mannanase granulates, pectate lyase granulates, xyloglucanase granulates, bleaching enzyme granulates and co-granulates of any of these enzymes, preferably these enzyme granulates comprise sodium sulphate; bleach particles, such as percarbonate particles, especially coated percarbonate particles, such as percarbonate coated with carbonate salt, sulphate salt, silicate salt, borosilicate salt, or any combination thereof, perborate particles, bleach activator particles such as tetra acetyl ethylene diamine particles and/or alkyl oxybenzene sulphonate particles, bleach catalyst particles such as transition metal catalyst particles, and/or isoquinolinium bleach catalyst particles, pre-formed peracid particles, especially coated pre-formed peracid particles; filler particles such as sulphate salt particles and chloride particles; clay particles such as montmorillonite particles and particles of clay and silicone; flocculant particles such as polyethylene oxide particles; wax particles such as wax agglomerates; silicone particles, brightener particles; dye transfer inhibition particles; dye fixative particles; perfume particles such as perfume microcapsules and starch encapsulated perfume accord particles, or pro-perfume particles such as Schiff base reaction product particles; hueing dye particles; chelant particles such as chelant agglomerates; and any combination thereof.

Suitable laundry detergent compositions comprise a detergent ingredient selected from: detersive surfactant, such as anionic detersive surfactants, non-ionic detersive surfactants, cationic detersive surfactants, zwitterionic detersive surfactants and amphoteric detersive surfactants; polymers, such as carboxylate polymers, soil release polymer, anti-redeposition polymers, cellulosic polymers and care polymers; bleach, such as sources of hydrogen peroxide, bleach activators, bleach catalysts and pre-formed peracids; photobleach, such as such as zinc and/or aluminium sulphonated phthalocyanine; enzymes, such as proteases, amylases, cellulases, lipases; zeolite builder; phosphate builder; co-builders, such as citric acid and citrate; carbonate, such as sodium carbonate and sodium bicarbonate; sulphate salt, such as sodium sulphate; silicate salt such as sodium silicate; chloride salt, such as sodium chloride; brighteners; chelants; hueing agents; dye transfer inhibitors; dye fixative agents; perfume; silicone; fabric softening agents, such as clay; flocculants, such as polyethyleneoxide; suds suppressors; and any combination thereof.

Suitable laundry detergent compositions may have a low buffering capacity. Such laundry detergent compositions typically have a reserve alkalinity to pH 9.5 of less than 5.0 g NaOH/100 g. These low buffered laundry detergent compositions typically comprise low levels of carbonate salt.

Detersive Surfactant: Suitable detersive surfactants include anionic detersive surfactants, non-ionic detersive surfactant, cationic detersive surfactants, zwitterionic detersive surfactants and amphoteric detersive surfactants. Suitable detersive surfactants may be linear or branched, substituted or un-substituted, and may be derived from petrochemical material or biomaterial.

Anionic detersive surfactant: Suitable anionic detersive surfactants include sulphonate and sulphate detersive surfactants.

Suitable sulphonate detersive surfactants include methyl ester sulphonates, alpha olefin sulphonates, alkyl benzene sulphonates, especially alkyl benzene sulphonates, preferably $C_{10-13}$ alkyl benzene sulphonate. Suitable alkyl benzene sulphonate (LAS) is obtainable, preferably obtained, by sulphonating commercially available linear alkyl benzene (LAB); suitable LAB includes low 2-phenyl LAB, other suitable LAB include high 2-phenyl LAB, such as those supplied by Sasol under the tradename Hyblene®.

Suitable sulphate detersive surfactants include alkyl sulphate, preferably $C_{8-18}$ alkyl sulphate, or predominantly $C_{12}$ alkyl sulphate.

A preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 5, more preferably from 0.5 to 3 and most preferably from 0.5 to 1.5.

The alkyl sulphate, alkyl alkoxylated sulphate and alkyl benzene sulphonates may be linear or branched, substituted or un-substituted, and may be derived from petrochemical material or biomaterial.

Other suitable anionic detersive surfactants include alkyl ether carboxylates.

Suitable anionic detersive surfactants may be in salt form, suitable counter-ions include sodium, calcium, magnesium, amino alcohols, and any combination thereof. A preferred counter-ion is sodium.

Non-ionic detersive surfactant: Suitable non-ionic detersive surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein preferably the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; alkylpolysaccharides, preferably alkylpolyglycosides; methyl ester ethoxylates; polyhydroxy fatty acid amides; ether capped poly(oxyalkylated) alcohol surfactants; and mixtures thereof.

Suitable non-ionic detersive surfactants are alkylpolyglucoside and/or an alkyl alkoxylated alcohol.

Suitable non-ionic detersive surfactants include alkyl alkoxylated alcohols, preferably $C_{8-18}$ alkyl alkoxylated alcohol, preferably a $C_{8-18}$ alkyl ethoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. The alkyl alkoxylated alcohol can be linear or branched, and substituted or un-substituted.

Suitable nonionic detersive surfactants include secondary alcohol-based detersive surfactants.

Cationic detersive surfactant: Suitable cationic detersive surfactants include alkyl pyridinium compounds, alkyl quaternary ammonium compounds, alkyl quaternary phosphonium compounds, alkyl ternary sulphonium compounds, and mixtures thereof.

Preferred cationic detersive surfactants are quaternary ammonium compounds having the general formula:

$(R)(R_1)(R_2)(R_3)N^+X^-$ wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulphonate.

Zwitterionic detersive surfactant: Suitable zwitterionic detersive surfactants include amine oxides and/or betaines.

Polymer: Suitable polymers include carboxylate polymers, soil release polymers, anti-redeposition polymers, cellulosic polymers, care polymers and any combination thereof.

Carboxylate polymer: The composition may comprise a carboxylate polymer, such as a maleate/acrylate random copolymer or polyacrylate homopolymer. Suitable carboxylate polymers include: polyacrylate homopolymers having a molecular weight of from 4,000 Da to 9,000 Da; maleate/acrylate random copolymers having a molecular weight of from 50,000 Da to 100,000 Da, or from 60,000 Da to 80,000 Da.

Another suitable carboxylate polymer is a co-polymer that comprises: (i) from 50 to less than 98 wt % structural units derived from one or more monomers comprising carboxyl groups; (ii) from 1 to less than 49 wt % structural units derived from one or more monomers comprising sulfonate moieties; and (iii) from 1 to 49 wt % structural units derived from one or more types of monomers selected from ether bond-containing monomers represented by formulas (I) and (II):

formula (I)

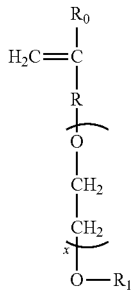

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

Formula (II)

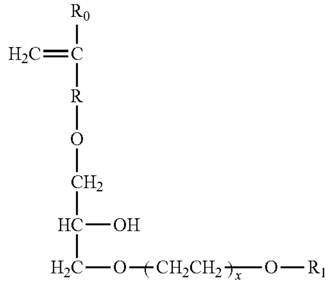

wherein in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

It may be preferred that the polymer has a weight average molecular weight of at least 50 kDa, or even at least 70 kDa.

Soil release polymer: The composition may comprise a soil release polymer. A suitable soil release polymer has a structure as defined by one of the following structures (I), (II) or (III):

$$-[(OCHR^1-CHR^2)_a-O-OC-Ar-CO-]_d \quad (I)$$

$$-[(OCHR^3-CHR^4)_b-O-OC\text{-}sAr-CO\text{-}]_e \quad (II)$$

$$-[(OCHR^5-CHR^6)_c-OR^7]_f \quad (III)$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are sold by Clariant under the TexCare® series of polymers, e.g. TexCare® SRN240 and TexCare® SRA300. Other suitable soil release polymers are sold by Solvay under the Repel-o-Tex® series of polymers, e.g. Repel-o-Tex® SF2 and Repel-o-Tex® Crystal.

Anti-redeposition polymer: Suitable anti-redeposition polymers include polyethylene glycol polymers and/or polyethyleneimine polymers.

Suitable polyethylene glycol polymers include random graft co-polymers comprising: (i) hydrophilic backbone comprising polyethylene glycol; and (ii) hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof. Suitable polyethylene glycol polymers have a polyethylene glycol backbone with random grafted polyvinyl acetate side chains. The average molecular weight of the polyethylene glycol backbone can be in the range of from 2,000 Da to 20,000 Da, or from 4,000 Da to 8,000 Da. The molecular weight ratio of the polyethylene glycol backbone to the polyvinyl acetate side chains can be in the range of from 1:1 to 1:5, or from 1:1.2 to 1:2. The average number of graft sites per ethylene oxide unit can be less than 0.02, or less than 0.016, the average number of graft sites per ethylene oxide unit can be in the range of from 0.010 to 0.018, or the average number of graft sites per ethylene oxide unit can be less than 0.010, or in the range of from 0.004 to 0.008.

Suitable polyethylene glycol polymers are described in WO08/007320.

A suitable polyethylene glycol polymer is Sokalan HP22.

Cellulosic polymer: Suitable cellulosic polymers are selected from alkyl cellulose, alkyl alkoxyalkyl cellulose, carboxyalkyl cellulose, alkyl carboxyalkyl cellulose, sulphoalkyl cellulose, more preferably selected from carboxymethyl cellulose, methyl cellulose, methyl hydroxyethyl cellulose, methyl carboxymethyl cellulose, and mixtures thereof.

Suitable carboxymethyl celluloses have a degree of carboxymethyl substitution from 0.5 to 0.9 and a molecular weight from 100,000 Da to 300,000 Da.

Suitable carboxymethyl celluloses have a degree of substitution greater than 0.65 and a degree of blockiness greater than 0.45, e.g. as described in WO09/154933.

Care polymers: Suitable care polymers include cellulosic polymers that are cationically modified or hydrophobically modified. Such modified cellulosic polymers can provide anti-abrasion benefits and dye lock benefits to fabric during the laundering cycle. Suitable cellulosic polymers include cationically modified hydroxyethyl cellulose.

Other suitable care polymers include dye lock polymers, for example the condensation oligomer produced by the condensation of imidazole and epichlorhydrin, preferably in ratio of 1:4:1. A suitable commercially available dye lock polymer is Polyquart® FDI (Cognis).

Other suitable care polymers include amino-silicone, which can provide fabric feel benefits and fabric shape retention benefits.

Bleach: Suitable bleach includes sources of hydrogen peroxide, bleach activators, bleach catalysts, pre-formed peracids and any combination thereof. A particularly suitable bleach includes a combination of a source of hydrogen peroxide with a bleach activator and/or a bleach catalyst.

Source of hydrogen peroxide: Suitable sources of hydrogen peroxide include sodium perborate and/or sodium percarbonate.

Bleach activator: Suitable bleach activators include tetra acetyl ethylene diamine and/or alkyl oxybenzene sulphonate.

Bleach catalyst: The composition may comprise a bleach catalyst. Suitable bleach catalysts include oxaziridinium bleach catalysts, transition metal bleach catalysts, especially manganese and iron bleach catalysts. A suitable bleach catalyst has a structure corresponding to general formula below:

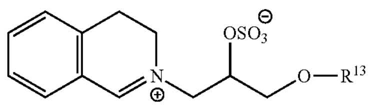

wherein $R^{13}$ is selected from the group consisting of 2-ethylhexyl, 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl.

Pre-formed peracid: Suitable pre-form peracids include phthalimido-peroxycaproic acid.

Enzymes: Suitable enzymes include lipases, proteases, cellulases, amylases and any combination thereof.

Protease: Suitable proteases include metalloproteases and/or serine proteases. Examples of suitable neutral or alkaline proteases include: subtilisins (EC 3.4.21.62); trypsin-type or chymotrypsin-type proteases; and metalloproteases. The suitable proteases include chemically or genetically modified mutants of the aforementioned suitable proteases.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Preferenz P® series of proteases including Preferenz® P280, Preferenz® P281, Preferenz® P2018-C, Preferenz® P2081-WE, Preferenz® P2082-EE and Preferenz® P2083-A/J, Properase®, Purafect®, Purafect Prime®, Purafect Ox®, FN3®, FN4®, Excellase® and Purafect OXP® by DuPont, those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

A suitable protease is described in WO11/140316 and WO11/072117.

Amylase: Suitable amylases are derived from AA560 alpha amylase endogenous to *Bacillus* sp. DSM 12649, preferably having the following mutations: R118K, D183*, G184*, N195F, R320K, and/or R458K. Suitable commercially available amylases include Stainzyme®, Stainzyme® Plus, Natalase, Termamyl®, Termamyl® Ultra, Liquezyme® SZ, Duramyl®, Everest® (all Novozymes) and Spezyme® AA, Preferenz S® series of amylases, Purastar® and Purastar® Ox Am, Optisize® HT Plus (all Du Pont).

A suitable amylase is described in WO06/002643.

Cellulase: Suitable cellulases include those of bacterial or fungal origin. Chemically modified or protein engineered mutants are also suitable. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum*.

Commercially available cellulases include Celluzyme®, Carezyme®, and Carezyme® Premium, Celluclean® and Whitezyme® (Novozymes A/S), Revitalenz® series of enzymes (Du Pont), and Biotouch® series of enzymes (AB Enzymes). Suitable commercially available cellulases include Carezyme® Premium, Celluclean® Classic. Suitable cellulases are described in WO07/144857 and WO10/056652.

Lipase: Suitable lipases include those of bacterial, fungal or synthetic origin, and variants thereof. Chemically modified or protein engineered mutants are also suitable. Examples of suitable lipases include lipases from *Humicola* (synonym *Thermomyces*), e.g., from *H. lanuginosa* (*T. lanuginosus*).

The lipase may be a "first cycle lipase", e.g. such as those described in WO06/090335 and WO13/116261. In one aspect, the lipase is a first-wash lipase, preferably a variant of the wild-type lipase from *Thermomyces lanuginosus* comprising T231R and/or N233R mutations. Preferred lipases include those sold under the tradenames Lipex®, Lipolex® and Lipoclean® by Novozymes, Bagsvaerd, Denmark.

Other suitable lipases include: Liprl 139, e.g. as described in WO2013/171241; and TfuLip2, e.g. as described in WO2011/084412 and WO2013/033318.

Other enzymes: Other suitable enzymes are bleaching enzymes, such as peroxidases/oxidases, which include those of plant, bacterial or fungal origin and variants thereof. Commercially available peroxidases include Guardzyme® (Novozymes A/S). Other suitable enzymes include choline oxidases and perhydrolases such as those used in Gentle Power Bleach™.

Other suitable enzymes include pectate lyases sold under the tradenames X-Pect®, Pectaway® (from Novozymes A/S, Bagsvaerd, Denmark) and PrimaGreen® (DuPont) and mannanases sold under the tradenames Mannaway® (Novozymes A/S, Bagsvaerd, Denmark), and Mannastar® (Du Pont).

Zeolite builder: The composition may comprise zeolite builder. The composition may comprise from 0 wt % to 5 wt % zeolite builder, or 3 wt % zeolite builder. The composition may even be substantially free of zeolite builder; substantially free means “no deliberately added”. Typical zeolite builders include zeolite A, zeolite P and zeolite MAP.

Phosphate builder: The composition may comprise phosphate builder. The composition may comprise from 0 wt % to 5 wt % phosphate builder, or to 3 wt %, phosphate builder. The composition may even be substantially free of phosphate builder; substantially free means “no deliberately added”. A typical phosphate builder is sodium tri-polyphosphate.

Carbonate salt: The composition may comprise carbonate salt. The composition may comprise from 0 wt % to 10 wt % carbonate salt, or to 5 wt % carbonate salt. The composition may even be substantially free of carbonate salt; substantially free means “no deliberately added”. Suitable carbonate salts include sodium carbonate and sodium bicarbonate.

Silicate salt: The composition may comprise silicate salt. The composition may comprise from 0 wt % to 10 wt % silicate salt, or to 5 wt % silicate salt. A preferred silicate salt is sodium silicate, especially preferred are sodium silicates having a $Na_2O:SiO_2$ ratio of from 1.0 to 2.8, preferably from 1.6 to 2.0.

Sulphate salt: A suitable sulphate salt is sodium sulphate.

Brightener: Suitable fluorescent brighteners include: distyryl biphenyl compounds, e.g. Tinopal® CBS-X, di-amino stilbene di-sulfonic acid compounds, e.g. Tinopal® DMS pure Xtra and Blankophor® HRH, and Pyrazoline compounds, e.g. Blankophor® SN, and coumarin compounds, e.g. Tinopal® SWN.

Preferred brighteners are: sodium 2 (4-styryl-3-sulfophenyl)-2H-napthol[1,2-d]triazole, disodium 4,4'-bis{[(4-anilino-6-(N methyl-N-2 hydroxyethyl)amino 1,3,5-triazin-2-yl)]; amino}stilbene-2-2' disulfonate, disodium 4,4'-bis{[(4-anilino-6-morpholino-1,3,5-triazin-2-yl)]amino} stilbene-2-2' disulfonate, and disodium 4,4'-bis(2-sulfostyryl)biphenyl. A suitable fluorescent brightener is C.I. Fluorescent Brightener 260, which may be used in its beta or alpha crystalline forms, or a mixture of these forms.

Chelant: The composition may also comprise a chelant selected from: diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid) and hydroxyethane di(methylene phosphonic acid). A preferred chelant is ethylene diamine-N'N'-disuccinic acid (EDDS) and/or hydroxyethane diphosphonic acid (HEDP). The composition preferably comprises ethylene diamine-N'N'-disuccinic acid or salt thereof. Preferably the ethylene diamine-N'N'-disuccinic acid is in S,S enantiomeric form. Preferably the composition comprises 4,5-dihydroxy-m-benzenedisulfonic acid disodium salt. Preferred chelants may also function as calcium carbonate crystal growth inhibitors such as: 1-hydroxyethanediphosphonic acid (HEDP) and salt thereof; N,N-dicarboxymethyl-2-aminopentane-1,5-dioic acid and salt thereof; 2-phosphonobutane-1,2,4-tricarboxylic acid and salt thereof; and combination thereof.

Hueing agent: Suitable hueing agents include small molecule dyes, typically falling into the Colour Index (C.I.) classifications of Acid, Direct, Basic, Reactive (including hydrolysed forms thereof) or Solvent or Disperse dyes, for example classified as Blue, Violet, Red, Green or Black, and provide the desired shade either alone or in combination. Preferred such hueing agents include Acid Violet 50, Direct Violet 9, 66 and 99, Solvent Violet 13 and any combination thereof.

Many hueing agents are known and described in the art which may be suitable for the present invention, such as hueing agents described in WO2014/089386.

Suitable hueing agents include phthalocyanine and azo dye conjugates, such as described in WO2009/069077.

Suitable hueing agents may be alkoxylated. Such alkoxylated compounds may be produced by organic synthesis that may produce a mixture of molecules having different degrees of alkoxylation. Such mixtures may be used directly to provide the hueing agent, or may undergo a purification step to increase the proportion of the target molecule. Suitable hueing agents include alkoxylated bis-azo dyes, such as described in WO2012/054835, and/or alkoxylated thiophene azo dyes, such as described in WO2008/087497 and WO2012/166768.

The hueing agent may be incorporated into the detergent composition as part of a reaction mixture which is the result of the organic synthesis for a dye molecule, with optional purification step(s). Such reaction mixtures generally comprise the dye molecule itself and in addition may comprise un-reacted starting materials and/or by-products of the organic synthesis route. Suitable hueing agents can be incorporated into hueing dye particles, such as described in WO 2009/069077.

Dye transfer inhibitors: Suitable dye transfer inhibitors include polyamine N-oxide polymers, copolymers of N-vinylpyrrolidone and N-vinylimidazole, polyvinylpyrrolidone, polyvinyloxazolidone, polyvinylimidazole and mixtures thereof. Preferred are poly(vinyl pyrrolidone), poly (vinylpyridine betaine), poly(vinylpyridine N-oxide), poly (vinyl pyrrolidone-vinyl imidazole) and mixtures thereof. Suitable commercially available dye transfer inhibitors include PVP-K15 and K30 (Ashland), Sokalan® HP165, HP50, HP53, HP59, HP56K, HP56, HP66 (BASF), Chromabond® S-400, 5403E and S-100 (Ashland).

Perfume: Suitable perfumes comprise perfume materials selected from the group: (a) perfume materials having a C log P of less than 3.0 and a boiling point of less than 250° C. (quadrant 1 perfume materials); (b) perfume materials having a C log P of less than 3.0 and a boiling point of 250° C. or greater (quadrant 2 perfume materials); (c) perfume materials having a C log P of 3.0 or greater and a boiling point of less than 250° C. (quadrant 3 perfume materials); (d) perfume materials having a C log P of 3.0 or greater and a boiling point of 250° C. or greater (quadrant 4 perfume materials); and (e) mixtures thereof.

It may be preferred for the perfume to be in the form of a perfume delivery technology. Such delivery technologies further stabilize and enhance the deposition and release of perfume materials from the laundered fabric. Such perfume delivery technologies can also be used to further increase the longevity of perfume release from the laundered fabric. Suitable perfume delivery technologies include: perfume microcapsules, pro-perfumes, polymer assisted deliveries, molecule assisted deliveries, fiber assisted deliveries, amine assisted deliveries, cyclodextrin, starch encapsulated accord, zeolite and other inorganic carriers, and any mixture thereof. A suitable perfume microcapsule is described in WO2009/101593.

Silicone: Suitable silicones include polydimethylsiloxane and amino-silicones. Suitable silicones are described in WO05075616.

Process for making the solid composition: Typically, the particles of the composition can be prepared by any suitable method. For example: spray-drying, agglomeration, extrusion and any combination thereof.

Typically, a suitable spray-drying process comprises the step of forming an aqueous slurry mixture, transferring it through at least one pump, preferably two pumps, to a pressure nozzle. Atomizing the aqueous slurry mixture into a spray-drying tower and drying the aqueous slurry mixture to form spray-dried particles. Preferably, the spray-drying tower is a counter-current spray-drying tower, although a co-current spray-drying tower may also be suitable.

Typically, the spray-dried powder is subjected to cooling, for example an air lift. Typically, the spray-drying powder is subjected to particle size classification, for example a sieve, to obtain the desired particle size distribution. Preferably, the spray-dried powder has a particle size distribution such that weight average particle size is in the range of from 300 micrometers to 500 micrometers, and less than 10 wt % of the spray-dried particles have a particle size greater than 2360 micrometers.

It may be preferred to heat the aqueous slurry mixture to elevated temperatures prior to atomization into the spray-drying tower, such as described in WO2009/158162.

It may be preferred for anionic surfactant, such as linear alkyl benzene sulphonate, to be introduced into the spray-drying process after the step of forming the aqueous slurry mixture: for example, introducing an acid precursor to the aqueous slurry mixture after the pump, such as described in WO 09/158449.

It may be preferred for a gas, such as air, to be introduced into the spray-drying process after the step of forming the aqueous slurry, such as described in WO2013/181205.

It may be preferred for any inorganic ingredients, such as sodium sulphate and sodium carbonate, if present in the aqueous slurry mixture, to be micronized to a small particle size such as described in WO2012/134969.

Typically, a suitable agglomeration process comprises the step of contacting a detersive ingredient, such as a detersive surfactant, e.g. linear alkyl benzene sulphonate (LAS) and/or alkyl alkoxylated sulphate, with an inorganic material, such as sodium carbonate and/or silica, in a mixer. The agglomeration process may also be an in-situ neutralization agglomeration process wherein an acid precursor of a detersive surfactant, such as LAS, is contacted with an alkaline material, such as carbonate and/or sodium hydroxide, in a mixer, and wherein the acid precursor of a detersive surfactant is neutralized by the alkaline material to form a detersive surfactant during the agglomeration process.

Other suitable detergent ingredients that may be agglomerated include polymers, chelants, bleach activators, silicones and any combination thereof.

The agglomeration process may be a high, medium or low shear agglomeration process, wherein a high shear, medium shear or low shear mixer is used accordingly. The agglomeration process may be a multi-step agglomeration process wherein two or more mixers are used, such as a high shear mixer in combination with a medium or low shear mixer. The agglomeration process can be a continuous process or a batch process.

It may be preferred for the agglomerates to be subjected to a drying step, for example to a fluid bed drying step. It may also be preferred for the agglomerates to be subjected to a cooling step, for example a fluid bed cooling step.

Typically, the agglomerates are subjected to particle size classification, for example a fluid bed elutriation and/or a sieve, to obtain the desired particle size distribution. Preferably, the agglomerates have a particle size distribution such that weight average particle size is in the range of from 300 micrometers to 800 micrometers, and less than 10 wt % of the agglomerates have a particle size less than 150 micrometers and less than 10 wt % of the agglomerates have a particle size greater than 1200 micrometers.

It may be preferred for fines and over-sized agglomerates to be recycled back into the agglomeration process. Typically, over-sized particles are subjected to a size reduction step, such as grinding, and recycled back into an appropriate place in the agglomeration process, such as the mixer. Typically, fines are recycled back into an appropriate place in the agglomeration process, such as the mixer.

It may be preferred for ingredients such as polymer and/or non-ionic detersive surfactant and/or perfume to be sprayed onto base detergent particles, such as spray-dried base detergent particles and/or agglomerated base detergent particles. Typically, this spray-on step is carried out in a tumbling drum mixer.

Method of laundering fabric: The method of laundering fabric comprises the step of contacting the solid composition to water to form a wash liquor, and laundering fabric in said wash liquor. Typically, the wash liquor has a temperature of above 0° C. to 90° C., or to 60° C., or to 40° C., or to 30° C., or to 20° C. The fabric may be contacted to the water prior to, or after, or simultaneous with, contacting the solid composition with water. Typically, the wash liquor is formed by contacting the laundry detergent to water in such an amount so that the concentration of laundry detergent composition in the wash liquor is from 0.2 g/l to 20 g/l, or from 0.5 g/l to 10 g/l, or to 5.0 g/l. The method of laundering fabric can be carried out in a front-loading automatic washing machine, top loading automatic washing machines, including high efficiency automatic washing machines, or suitable hand-wash vessels. Typically, the wash liquor comprises 90 litres or less, or 60 litres or less, or 15 litres or less, or 10 litres or less of water. Typically, 200 g or less, or 150 g or less, or 100 g or less, or 50 g or less of laundry detergent composition is contacted to water to form the wash liquor.

Analysis: The samples can be analyzed using differential scanning calorimetry (DSC) and small/wide angle X-ray scattering (SWAXS) or X-ray diffraction (XRD). DSC measures the melting point while SWAXS/XRD determines the number and type of crystals present in the sample, e.g. fatty acid, soap and fatty acid soap, and for the latter, the mole ratio of the fatty acid to soap.

DSC: The samples with varying degree of neutralization are grounded and a few milligrams of the sample is loaded onto an aluminium pan. The sample pan is heated at a continuous heating rate of 5-10° C./min from ambient temperature to 100° C. The corresponding melting peaks are then determined.

SWAXS/XRD: The grounded samples are loaded onto a sample holder. The sample holder is then placed onto a temperature stage. The samples are heated at 5° C. steps from ambient to 80° C. and the SWAXS/XRD recorded at each step for 10-20 minutes depending on the signal intensity.

The DSC and SWAXS/XRD data as a function of degree of neutralization and temperature are then compared to identify the presence of fatty acid and fatty acid soap crystals.

Examples

A comparison was made between a granular laundry detergent composition according to the present invention and a granular laundry detergent composition outside of the scope of the present claims.

An aqueous alkaline slurry composed of sodium sulphate, sodium carbonate, water, acrylate/maleate co-polymer and miscellaneous ingredients was prepared at 80° C. in a crutcher making vessel. Alkyl benzene sulphonic acid (HLAS) and sodium hydroxide were added to the aqueous slurry and the slurry was pumped through a standard spray system pressure nozzle and atomized into a counter current spray drying tower at an air inlet temperature of 275° C. The atomized slurry was dried to produce a solid mixture, which was then cooled and sieved to remove oversize material (>1.8 mm) to form a spray-dried powder. The spray-dried powder had a bulk density of 470 g/l.

The composition of the spray-dried powder is given below.

TABLE 1

Spray-dried laundry detergent powder composition

| Component | %w/w Spray Dried Powder |
|---|---|
| Sodium silicate salt | 11.6 |
| $C_8$-$C_{24}$ alkyl benzene sulphonate | 19.5 |
| Acrylate/maleate copolymer | 3.5 |
| Hydroxyethane di(methylene phosphonic acid) | 0.8 |
| Sodium carbonate | 17.4 |
| Sodium sulphate | 43.4 |
| Water | 2.5 |
| Miscellaneous, such as magnesium sulphate, and one or more stabilizers | 1.3 |
| Total Parts | 100.00 |

TABLE 2

A granular laundry detergent composition

| Component | Powder A | Powder B | Powder C |
|---|---|---|---|
| | % w/w granular laundry detergent composition | | |
| Spray-dried powder (described above in table 1) | 49.60 | 49.60 | 49.60 |
| 91.6 wt % active linear alkyl benzene sulphonate flake supplied by Stepan under the tradename Nacconol 90G ® | 14.20 | 14.20 | 14.20 |
| Citric acid | 1.04 | 1.04 | 1.04 |
| Sodium percarbonate (having from 12% to 15% active AvOx) | 13.49 | 13.49 | 13.49 |
| Tetraacetyl ethylene diamine agglomerate (92 wt % active) | 4.03 | 4.03 | 4.03 |
| Sodium carbonate | 3.11 | 3.11 | 3.11 |
| Sodium sulphate | 13.28 | 13.14 | 13.12 |
| Ethoxylated $C_{12}$-$C_{18}$ alcohol having an average degree of ethoxylation of 7 (AE7) | 1.25 | 1.25 | 1.25 |
| Fatty acid (palm stearin fatty acid ($C_{16}$-$C_{18}$) from Caila & Pares, Oleochemicals Manufacture, Spain | 0 | 0.14 | 0.07 |
| Soap | 0 | 0 | 0.07 |
| Total Parts | 100.00 | 100.00 | 100.00 |

The above granular laundry detergent compositions were prepared by dry-mixing all the above particles (all except AE7, Fatty acid & NaOH) in a continuous rotary mixer (drum diameter 0.6 meters, drum length 1.8 meters, 28 revolutions per min). The mass flow rate of the spray dried powder feed into the continuous rotary mixer was set at 992 kg/hr to produce granular detergent composition A, B & C. For powder A, AE7 in liquid form was sprayed on to the powder particles as they passed through the continuous rotary mixer.

Powder B was prepared where the liquid mixture is formed by contacting molten fatty acid and non-ionic surfactant by passing through a high shear dynamic mixer (IKA Dispax—Reactor®; Model Size: DR2000/Mixer Speed 4000 rpm). The liquid mixture is contacted to the full granular detergent powder by spraying the mixture at a temperature of ~55° C. onto the detergent powder.

According to the present invention, a granular detergent composition (Powder C) was prepared where the liquid mixture is formed by contacting molten fatty acid, non-ionic surfactant and aqueous sodium hydroxide by passing through a high shear dynamic mixer (IKA Dispax-Reactor®; Model Size: DR2000/Mixer Speed 4000 rpm). The liquid mixture is contacted to the full granular detergent powder by spraying the mixture at a temperature of ~55° C. onto the detergent powder.

1 kg Representative powder samples exiting the continuous rotary mixer was taken for powder A, B and C and analyzed cake strength. The average analysis is presented in table 3.

TABLE 3

Cake Strength analysis on granular detergent compositions A, B & C

| | Cake Strength (kgf) |
|---|---|
| Powder Detergent A | 7.5 |
| Powder Detergent B | 9.1 |
| Powder Detergent C | 3.6 |

The cake strength for powder C is significantly lower compared to powder A & B according to the present invention. The lower cake strength signifies significant improvements in powder flow characteristics.

This example exemplifies the importance for forming a mixture of partially neutralized fatty acid, comprising fatty acid and soap, together with non-ionic surfactant into the composition in a such a manner so that the resultant composition exhibits improved powder flow characteristics.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm”.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for preparing a solid free-flowing particulate laundry detergent composition, wherein the process comprises the steps of:

(a) forming a mixture by contacting:

(i) fatty acid;

(ii) liquid alkaline ingredient, and (iii) non-ionic surfactant, to obtain a mixture, wherein the mixture comprises:

(i) from about 4.0wt % to about 24.0wt % partially neutralized fatty acid component, wherein the partially neutralized fatty acid component comprises:

(i) (i) from about 38.0wt % to about 84.0wt % fatty acid; and (i) (ii) from about 16.0wt % to about 62.0wt % soap;

(ii) from about 75wt % to about 95wt % non-ionic surfactant; and (iii) from about 0.15wt % to about 2.80wt % water, wherein in step (a), the fatty acid is at a temperature at least 5° C. greater than the melting range of the fatty acid;

wherein the molar ratio of fatty acid to liquid alkaline ingredient contacted together in step (a) is above about 1:1;

(b) contacting the mixture obtained in step (a) to a detergent powder to form a solid free-flowing particulate laundry detergent composition, wherein in step (b) the mixture is contacted to the detergent powder by spraying the mixture at a temperature of greater than about 50° C. onto the detergent powder, wherein the detergent powder comprises a detergent ingredient, wherein the solid free-flowing particulate laundry detergent composition comprises:

(i) from about 0.2wt % to about 5.0wt % non-ionic surfactant;

(ii) from about 0.0015wt % to about 0.1800wt % soap;

(iii) from about 0.0035wt % to about 0.2700wt % fatty acid;

(iv) from about 0.0003wt % to about 0.0370wt % water; and (v) from about 5.0wt % to about 25wt % anionic detersive surfactant.

2. A process according to claim 1, wherein the liquid alkaline ingredient is sodium hydroxide.

3. A process according to claim 1, wherein step (a) is carried out in a mixer having a tip speed in the range of from about 10 $ms^{-1}$ to about 30 $ms^{-1}$.

4. A process according to claim 1, wherein the solid free-flowing particulate laundry detergent composition comprises less than about 0.1wt % fatty acid.

5. A process according to claim 1, wherein in step (b) the mixture is contacted to the detergent powder by spraying the mixture at a temperature of greater than about 55°° C. onto the detergent powder.

6. A process according to claim 1, wherein the molar ratio of fatty acid to soap in the partially neutralized fatty acid component is in the range of from about 1:0.5 to about 1:5.0.

7. A process according to claim 1, wherein the fatty acid is a $C_{16}$-$C_{18}$ fatty acid.

8. A process according to claim 1, wherein the non-ionic surfactant is an ethoxylated $C_8$-$C_{18}$ alkyl alcohol having an average degree of ethoxylation of from about 3 to about 10.

9. A process according to claim 1, wherein the solid free-flowing particulate laundry detergent composition comprises:

(i) fatty acid in crystalline form; and (ii) soap in crystalline form.

10. A process according to claim 9, wherein at least part of the fatty acid and at least part of the soap are together in the form of co-crystals.

11. A process according to claim 1, wherein the anionic detersive surfactant is an alkyl benzene sulphonate.

* * * * *